(12) United States Patent
Piechowski et al.

(10) Patent No.: US 6,809,286 B2
(45) Date of Patent: Oct. 26, 2004

(54) SHIELDING GAS FILTER FOR WELDING APPARATUS

(75) Inventors: Gerald P. Piechowski, Hortonville, WI (US); Mark R. Christopher, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/064,782

(22) Filed: Aug. 16, 2002

(65) Prior Publication Data

US 2004/0031841 A1 Feb. 19, 2004

(51) Int. Cl.[7] .............................. B23K 15/00; B23K 9/00
(52) U.S. Cl. ............... 219/121.33; 219/74; 219/121.51; 55/482; 228/19
(58) Field of Search .................. 219/201, 522, 219/526, 74, 121.33, 121.51, 219, 54, 121.5, 137.9; 228/19, 218–221, 42; 55/208, 381, 385.1, 482, 525, 301, 302, 307, 308, 315

(56) References Cited

U.S. PATENT DOCUMENTS

| | | | | |
|---|---|---|---|---|
| 2,413,991 A | * | 1/1947 | Newman | 210/457 |
| 3,883,331 A | * | 5/1975 | Bernard et al. | 55/381 |
| 3,917,458 A | * | 11/1975 | Polak | 422/169 |
| 4,300,034 A | * | 11/1981 | Schneider et al. | 219/75 |
| 4,465,238 A | * | 8/1984 | Patel et al. | 239/590.3 |
| 4,528,436 A | * | 7/1985 | Stol | 219/74 |
| 4,642,445 A | * | 2/1987 | Stol | 219/121.84 |
| 4,746,338 A | * | 5/1988 | Williams | 422/119 |
| 5,064,454 A | * | 11/1991 | Pittman | 55/302 |
| 5,114,447 A | * | 5/1992 | Davis | 55/485 |
| 5,198,240 A | * | 3/1993 | Baxi | 425/145 |
| 5,307,568 A | * | 5/1994 | Matsuo et al. | 34/92 |
| 5,388,413 A | * | 2/1995 | Major et al. | 62/640 |
| 5,617,727 A | * | 4/1997 | Zito | 62/55.5 |
| 5,711,865 A | * | 1/1998 | Caesar | 205/628 |
| 5,844,201 A | * | 12/1998 | Dibacco et al. | 219/137.43 |
| 5,846,271 A | * | 12/1998 | Flynn et al. | 55/315 |
| 5,981,897 A | * | 11/1999 | Offer et al. | 219/75 |
| 2001/0043891 A1 | * | 11/2001 | Adiletta | 422/177 |
| 2002/0046555 A1 | * | 4/2002 | Sherwood, Jr. | 55/482 |

* cited by examiner

*Primary Examiner*—L. Edmondson
(74) *Attorney, Agent, or Firm*—Ziolkowski Patent Solutions Group, LLC

(57) ABSTRACT

A shielding gas filter that can be readily incorporated into a gas shielding system for an arc welding apparatus. The gas shielding filter is readily installed to the system upstream of a gas solenoid valve and removes any potentially harmful particles from the supply of the shielding gas to prevent those particles from entering the gas solenoid valve. The shielding gas filter includes a housing having an inlet and an outlet and a specially formed passageway that communicates between the inlet and the outlet. A filter screen is retained within the housing to filter out the particles larger than a predetermined size. Preferably, the filter screen is constructed of stainless steel and filters out particles larger than about 100 microns.

33 Claims, 1 Drawing Sheet

SHIELDING GAS FILTER FOR WELDING APPARATUS

BACKGROUND OF INVENTION

The present invention relates to welding apparatus, and, more particularly, to a welding apparatus that utilizes a shielding gas during the welding operation.

It is, of course, well known in the use of arc welding apparatus, for the particular arc welding apparatus to utilize a shielding gas, generally an inert gas such as argon, to provide a blanket or shield for the weld as it is being formed. The use of the shielding gas both enhances the performance of the welding apparatus as well as shield the welding area from contaminants. With the use of such shielding gases, it is also common for the gas to be supplied in cylinders that contain the gas at an elevated pressure and that gas is thereafter supplied through gas hoses so that the gas can ultimately be directed onto the weld itself as that weld is being carried out.

Thus, in the system to supply the shielding gas, there normally is a flexible gas hose that is connected to the gas cylinder and which carries the gas to the welding wire feeder. Other standard components include a flow meter located just downstream of the gas valve on the cylinder so that the user can regulate and set the desired flow of the shielding gas to the welding wire feeder. As a further standard component, the shielding gas is turned on and off to the workpiece by means of a gas solenoid valve, generally located at the wire feeder so that the on/off control of the supply of gas can be controlled through an electrical signal.

One problem with the use of such gas solenoid valves, however, is that they are susceptible to damage from dirt or sand dust and the like that, if allowed to invade the internal areas of the gas solenoid valve, can cause harm to the gas solenoid valve and ultimately disrupt its operation. As such, the user then has to disassemble the gas solenoid valve to clean that valve and then reassemble the gas solenoid valve to return the welding apparatus to its operative state. Obviously, such disassembly, cleaning and reassembly causes an undesirable downtime in the operation of the welding apparatus and a reduction of overall efficiency of production for the welding process.

Accordingly, it would be advantageous to be able to avoid the downtime necessitated by the cleaning of the gas solenoid valve and to prevent the dust and unwanted particles from entering into the gas solenoid valve by some means that is easy to use, reliable, relatively inexpensive and which can be added or retrofitted to existing welding apparatus in a quick and efficient manner.

BRIEF DESCRIPTION OF INVENTION

Accordingly, the present invention relates to a gas filter that can be used to prevent particles exceeding a predetermined size from entering into the gas shielding solenoid valve and to a system utilizing that gas filter. With the present invention, a gas filter is located upstream of the gas shielding solenoid valve to filter particles in the stream of the shielding gas from the gas cylinder so that such particles are prevented from entering the gas solenoid valve. By employment of the gas filter, therefore, the harmful particles cannot enter and disrupt the operation of the gas solenoid valve.

With the present invention, the gas filter is comprised of a housing that has an inlet and an outlet with a passageway that extends between the inlet and the outlet. In the preferred embodiment, the housing is a brass housing and the outlet is a male pipe thread fitting that can be connected to the standard female thread fitting of the gas solenoid valve. The inlet of the gas filter is preferably a female pipe thread fitting that can readily be connected to the male fitting of a standard gas hose that normally is used to convey the shielding gas from the gas cylinder to the gas solenoid valve. With the preferred fittings, the present gas filter can readily be added or retrofitted to existing arc welding systems such that the gas filter can be easily and conveniently used to upgrade existing systems.

The gas filter has a filter screen that is retained within the housing and which is preferably constructed of stainless steel with a pore size of about 100 microns so as to prevent any particle exceeding that dimension from passing through the gas filter. The filter screen is located with the passageway such that all of the shielding gas passing through the gas filter must pass through the filter screen, thus effectively filtering all of the shielding gas that can reach the gas solenoid valve.

The passageway is specifically designed to retain the filter screen in place within the housing and to allow the filter screen to be easily inserted into the housing by passing the filter screen through the inlet of the gas filter and progressively moving the filter screen toward the outlet past a portion of the passageway that tapers inwardly, requiring the filter screen to be compressed inwardly and its outer dimension reduced until the filter screen reaches an outwardly extending annular recess formed in the housing. The annular recess has an outer dimension that is about the same as the outer peripheral dimension of the filter screen such that the filter screen can return to its normal dimension and be retained within the annular recess.

At the inner end of the inwardly tapering portion of the passageway, there is therefore formed a sharp circular edge that forms one side of the annular recess and which prevents the filter screen from readily returning outwardly toward the inlet of the gas filter.

Accordingly, with the use of the present gas filter, the housing of the gas filter preferably has an outlet and inlet having the standard threads that are used in the gas system providing the shielding gas to the welding apparatus such that the gas filter can simply be installed by disconnecting the gas hose leading to the gas solenoid valve and by connecting the mating male threads of the gas filter outlet to the female threads of the gas solenoid valve. The male end of the gas hose can then be reattached to the female mating threads of the gas filter to add the protection of the gas filtering capability to a welding system that thereafter protects the gas solenoid valve from the invasion of particles that could damage and disrupt the continuous operation of the welding operation.

These and other features and advantages of the present invention will become more readily apparent during the following detailed description taken in conjunction with the drawings herein.

BRIEF DESCRIPTION OF DRAWINGS

The drawings illustrate one preferred embodiment presently contemplated for carrying out the invention.

In the drawings.

DETAILED DESCRIPTION

Figure 1:
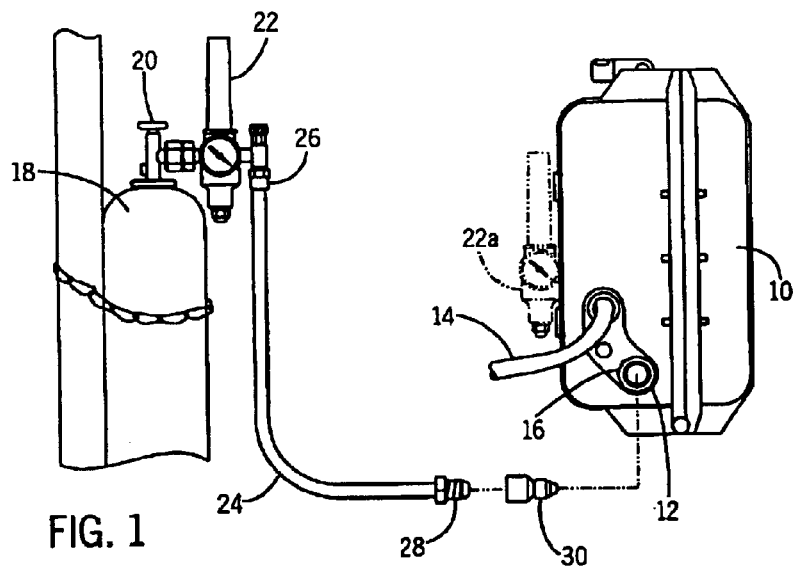
FIG. 1 is an exploded, schematic view of a shielding gas system providing a shielding gas to a welding apparatus.

Referring now to FIG. 1, there is shown an exploded schematic view of a gas shielding supply system that is used to supply a shielding gas to a welding wire feeder 10. The welding wire feeder 10 is a conventional apparatus that feeds the consumable wire to a welding gun, commonly referred to as a MIG gun, and that wire is advanced by the welding wire feeder 10 to and through the welding gun at a controlled rate.

There is also a gas solenoid valve 12 that is associated with the welding wire feeder 10 and which provides an on/off control of the shielding gas supplied to the welding operation. As can be seen, the gas solenoid valve 12 has an electrical cable 14 that is used to deliver electrical signals to switch the gas solenoid valve 12 between its on and its off positions. The sign to open and/or close the gas solenoid valve 12 is normal located at the welding gun (not shown) so that the user can control the application of the shielding gas as the welding gun is being used.

As is also conventional with the gas solenoid valve 12, there is a female fitting 16 on the gas solenoid valve 12 and that female fitting 16 is generally a standard ⅝-18 right-hand threaded fitting to mate with other conventional fittings used in the shielding gas supply system to deliver the shielding gas to the welding operation.

The shielding gas itself is supplied by means of a gas cylinder 18 that contains the shielding gas, under pressure, and typically the shielding gas is an inert gas, such as argon, to shield the actual weld as the welding operation is being carried out. Control of the supply of the shielding gas is normally accomplished by means of a cylinder valve 20 and a flowmeter 22, such as a float type flowmeter, connected to the cylinder valve 20 at the location of the gas cylinder 18 so that the user can adjust the cylinder valve 20 by visual reference to the flowmeter 22 conveniently located proximate thereto. Flowmeter 22 can also be mounted on the feeder 10 as shown in phantom as 22a. This alternate embodiment allows easy flow control in remote applications.

Downstream of the flowmeter 22, there is a gas hose 24 that connects to the flowmeter 22 to receive the shielding gas at the desired flow to deliver the shielding gas to the welding wire feeder 10. As is also conventional, the upstream end of the gas hose 24 is provided with a female threaded fitting 26 that connects to the flowmeter 22 and the downstream end of the gas hose 24 terminates in a male threaded fitting 28 that normally would connect to the corresponding threaded female fitting 16 on the welding wire feeder 10.

In FIG. 1, however, there can also be seen to be a shielding gas filter 30 that is located intermediate the gas hose 24 and the welding wire feeder 10 and, as will become clear, all of the shielding gas that is delivered to the welding wire feeder 10 passes through the shielding gas filter 30 where particles of a predetermined size are prevented from reaching the gas solenoid valve 12 where those particles could potentially harm the operation and function of the gas solenoid valve 12.

Figure 2:
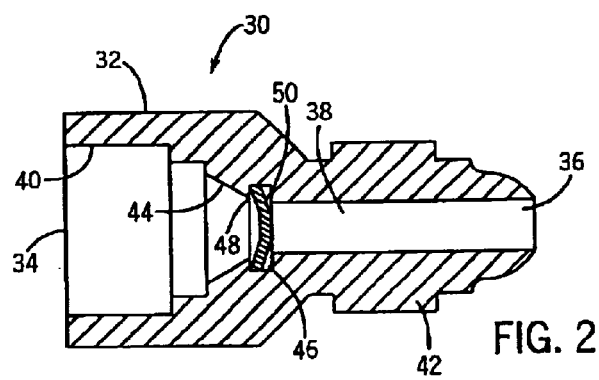
FIG. 2 side cross sectional view of a shielding gas filter constructed in accordance with the present invention.

Turning now to FIG. 2, there is shown a side cross-sectional view of the shielding gas filter 30 constructed in accordance with the present invention having a housing 32 that is preferable constructed of brass. The housing 32 has an inlet 34 and an outlet 36 and a passageway 38 formed in the housing 32 communicating between the inlet 34 and the outlet 36 for the flow of the shielding gas therebetween.

In order to make the shielding gas filter 30 compatible and therefore easy to install in welding systems, the inlet 34 is preferably formed with standard female threaded fitting having the female threads 40 formed therein and which can easily be connected to other standard gas fittings used in the shielding gas system for welding apparatus. Similarly, the outlet 36 is formed with external male threads 42 such that the outlet 36 is also a standard male threaded fitting, with both the inlet and outlet 36 having both fittings preferably of the normal ⅝-18 threads.

Thus, returning briefly to FIG. 1, it can now be seen that the shielding gas filter 30 can be easily added to the gas shielding system by simply disconnecting the male threaded fitting 28 of the gas hose 24 that would normally be connected directly into the female fitting 16 of the gas solenoid valve 12, connecting the outlet 36 of the shielding gas filter 30 to the female fitting 16 and thereafter reconnecting the male threaded fitting 28 of the gas hose 24 to the inlet 34 of the shielding gas filter 30 to add the protection afforded by the present invention to the gas shielding system. The procedure is simplified since all of the connections and fittings are designed to be compatible with each other and are standard threaded fittings.

Again, with reference to FIG. 2, it can be seen that the passageway 38 is specially formed and includes an inwardly tapered portion 44 where the external peripheral diameter of the passageway 38 is reduced in the direction away from the inlet 34, that is, toward the outlet 36. At the inner end of the inwardly tapered portion 44, there is formed, an outwardly extending, internal annular recess 46 where the outer diameter of the passageway 38 is enlarged from the inner edge 48 of the inwardly tapered portion 44 and the inner edge 48 is thus formed as a sharp circular inner edge 48.

Figure 3:
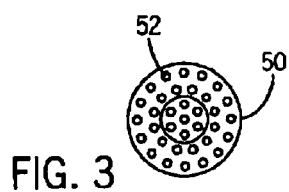
FIG. 3 is a front view of a filter screen that is used with the present invention.

Within the internal annular recess 46 there is positioned a filter screen 50 and which can better be seen with reference also to FIG. 3 where there is shown a front view of the filter screen 50. As can be seen, the filter screen 50 is preferably circular in configuration and constructed of stainless steel having a plurality of uniformly distributed micro pores 52 formed therein, each sized about 100 microns such that particles larger than about 100 microns can not pass through the filter screen 50.

The external diameter of the filter screen 50 is predetermined so as to fit within the internal annular recess 46 with a slight bend so that the filter screen 50 will be firmly retained therein. During installation, the filter screen 50 can easily be inserted into the inlet 34 formed in the housing 32 and be progressively moved toward the outlet 36. As the filter screen 50 passes through the inwardly tapered portion 44 of the passageway 38, the outer diameter of the filter screen 50 is squeezed inwardly until the filter screen passes by the sharp inner edge 48 to reach the internal annular recess 46 where the filter screen 50 can again spring outwardly to be firmly held with the internal annular recess 46.

The sharp inner edge 48 prevents the filter screen 50 from migrating back toward the inlet 34 such that the filter screen 50 is firmly retained within the internal annular recess 46.

The firm retaining of the filter screen 50 within the housing 32 is important in achieving the ease of cleaning the shielding gas filter 30 when needed. As can now be understood, since the shielding gas filter 30 captures all of the particles passing from the supply of shielding gas and prevents those particles from entering the gas solenoid valve 12, (FIG. 1) there may be an eventual build up of the particles within the shielding gas filter 30. A convenience of the present shielding gas filter 30 is the ability to easily clean the filter by removing those particles. To do so, the shielding gas filter 30 is easily disconnected from its connections to the gas hose 24 and the gas solenoid valve 12 by unscrewing the fittings, whereupon the gas shielding gas filter 30, once fully disconnected, can simply be tapped lightly on a solid surface in the direction toward the inlet 34 to cause the trapped particles to fall outwardly from the inlet 34.

As such, rather than having to disassemble the gas solenoid valve 12 to clean the gas shielding system of potentially damaging particles, the cleaning can now, with the use of the present invention, be readily carried out by a simple procedure of unblocking the particles captured on the upstream side of the filter screen 50 by the act of removing the shielding gas filter 30 and tapping it to loosen and remove those particles that drop outwardly from the inlet 34 of the shielding gas filter 30.

Those skilled in the art will readily recognize numerous adaptations and modifications which can be made to the shielding gas filter and method of using the same of the present invention which will result in an improved process and device, yet all of which will fall within the scope and spirit of the present invention as defined in the following claims. Accordingly, the invention is to be limited only by the following claims and their equivalents.

The present invention has been described in terms of the preferred embodiment, and it is recognized that equivalents, alternatives, and modifications, aside from those expressly stated, are possible and within the scope of the appending claims.

What is claimed is:

1. A welding system having a gas filter for preventing a shielding gas supplied from a gas cylinder from introducing particles exceeding a predetermined size from entering a gas solenoid valve, the gas filter having a welding system comprising a housing, the housing having an inlet adapted to be connected to a gas cylinder and an outlet adapted to be connected to a gas solenoid valve, the housing having a passageway extending between the inlet and the outlet, a filter screen retained within the housing, the filter screen being located in the passageway to prevent particles exceeding a predetermined size from passing through the filter screen to reach the outlet.

2. The welding system of claim 1 wherein the inlet of the gas filter comprises a standard female threaded fitting and the outlet comprises a standard male threaded fitting.

3. The welding system of claim 1 wherein the filter screen of the gas filter is constructed of stainless steel having a plurality of micro pores formed therein.

4. The welding system of claim 3 wherein the micro pores of the filter screen prevent passage through the filter screen of particles larger than about 100 microns.

5. The welding system of claim 1 wherein the gas filter passageway is formed within the housing to have an outwardly extending internal annular recess and the filter screen is retained within the housing by being fitted within the annular recess.

6. The welding system of claim 5 wherein the gas filter passageway tapers inwardly in the direction from the inlet toward the outlet to create a sharp circular edge forming one edge of the annular recess.

7. A system for providing a shielding gas to a welding apparatus, the system comprising a cylinder containing a quantity of shielding gas, a gas hose having one end connected to the cylinder, a gas solenoid valve adapted to be opened and closed by means of an electrical signal, the gas solenoid valve having an inlet, a shielding gas filter having an outlet connected to the inlet of the gas solenoid valve and an inlet connected to the other end of the gas hose, the shielding gas filter having a housing, the housing having an inlet and an outlet and a passageway extending between the inlet and the outlet, a filter screen retained within the housing, the filter screen located within the passageway to prevent particles exceeding a predetermined size from passing through the filter screen to reach the outlet.

8. A system as defined in claim 7 wherein the inlet of the housing comprises a female threaded fitting and the outlet of the housing comprises a male threaded fitting.

9. A system as defined in claim 8 wherein the filter screen is a stainless steel material having micro pores formed therein.

10. A system as defined in claim 9 wherein the micro pores prevent particles larger than 100 microns for passing through the micro pores.

11. A system as defined in claim 7 wherein the passageway is formed within the housing to have an outwardly extending internal annular recess and the filter screen is retained within the housing by being fitted within the annular recess.

12. A system as defined in claim 11 wherein the passageway tapers inwardly in the direction from the inlet toward the outlet to create a sharp circular edge forming one edge of the annular recess.

13. A method of preventing particles exceeding a predetermined size from entering a gas solenoid valve connected to a gas hose delivering a shielding gas in a welding apparatus, the method comprising the steps of:

providing a shielding gas filter comprising a housing having a passageway and having a gas filter screen located in the passageway, disconnecting the gas hose from the gas solenoid valve, connecting the shielding gas filter to the gas solenoid valve;

connecting the gas hose to the shielding gas filter, whereby all of the gas from the gas supply passes through the shielding gas filter before entering the solenoid valve.

14. A method as defined in claim 13 where the step of providing a shielding gas filter comprises providing a shielding gas filter having a gas filter screen with a plurality of micro pores formed therein.

15. A method as defined in claim 14 where the step of providing a shielding gas filter comprises providing a shielding gas filter having a gas filter screen with micro pores of about 100 microns.

16. A method as defined in claim 13 where the step of providing a gas shielding filter comprises providing a shielding gas filter having an inlet that is a female threaded fitting and an outlet that is a male threaded fitting.

17. A method as defined in claim 13 where the step of providing a shielding gas filter comprises providing a housing having a passageway having an outwardly extending internal annular recess formed therein and the gas filter screen is located within the annular recess.

18. A system as defined in claim 7 incorporated into a device capable of generating power applicable to welding.

19. The method as defined in claim 13 whereby all of the gas from the gas supply further passes to a torch of a welding device thereby shielding a weld performed thereat.

20. A welding system comprising:

a gas cylinder having a shielding gas therein;

a regulator attached to the gas cylinder and constructed to regulate a flow therefrom;

a solenoid valve in fluid communication with the regulator and constructed to control flow to a welding torch;

a housing disposed between the regulator and the solenoid valve; and a filter located in the housing and constructed to filter a flow of shielding gas therethrough.

21. The welding system of claim 20 wherein the filter is planar.

22. The welding system of claim 20 wherein the housing further comprises an annular groove on an interior surface thereof wherein the annular groove is constructed to receive the filter.

23. The welding system of claim 20 wherein the filter is press fit into the housing.

24. The welding system of claim 20 wherein the housing further comprises an inlet having threading therein and an outlet having a threading thereon.

25. The welding system of claim 22 wherein a diameter of the annular groove is slightly less than a diameter of the filter such that the filter is deflected when positioned into the groove.

26. The welding system of claim 22 wherein the annular groove has a thickness that is slightly larger than a thickness of the filter.

27. A shielding gas filter assembly comprising:

a housing having an inlet constructed to connect the housing to a shielding gas source and an outlet constructed to connect the housing to a welding apparatus;

a passageway extending through the housing between the inlet and the outlet; and a filter screen retained in the housing and located in the passageway to prevent particles exceeding a predetermined size from passing through the filter screen and reaching the outlet of the housing.

28. The assembly of claim 27 further comprising an annular groove formed in the passageway between the inlet and the outlet, the annular groove constructed to removeably retain the filter screen within the housing.

29. The assembly of claim 27 wherein the filter screen is generally planar and has a plurality of micro pores formed therethrough.

30. The assembly of claim 27 wherein the filter screen is constructed from stainless steel.

31. The assembly of claim 27 wherein the filter screen is positioned in the housing generally transverse to a direction of flow through the passageway.

32. The assembly of claim 27 wherein a diameter of the passageway proximate the inlet is greater than a diameter of the passageway proximate the outlet.

33. The assembly of claim 27 further comprising a solenoid valve fluidly connected between the outlet of the housing and the welding apparatus.

* * * * *